US006110045A

United States Patent [19]

Schoeps

[11] Patent Number: 6,110,045
[45] Date of Patent: Aug. 29, 2000

[54] HYDRAULIC TORQUE IMPULSE GENERATOR

[75] Inventor: Knut Christian Schoeps, Tyresö , Sweden

[73] Assignee: Atlas Copco Tools AB, Tokyo, Japan

[21] Appl. No.: 09/090,050

[22] Filed: Jun. 3, 1998

[51] Int. Cl.[7] .......... F16D 31/02

[52] U.S. Cl. .......... 464/25; 464/26; 464/28; 277/926; 173/93.5

[58] Field of Search .......... 173/93, 93.5, 93.6, 173/208; 81/57.44; 277/634, 926, 928; 464/25, 26, 27, 28

[56] References Cited

U.S. PATENT DOCUMENTS

| | | | |
|---|---|---|---|
| 3,116,617 | 1/1964 | Skoog | 464/25 |
| 3,174,606 | 3/1965 | Hornschuch et al. | 173/93 |
| 3,181,672 | 5/1965 | Swanson | 173/93 |
| 3,182,470 | 5/1965 | Smith | 464/25 |
| 3,199,314 | 8/1965 | Schrader | 464/25 |
| 3,214,940 | 11/1965 | Kramer | 464/25 |
| 3,289,407 | 12/1966 | Brown | 464/25 |
| 3,292,391 | 12/1966 | Kramer et al. | 173/93 |
| 3,319,723 | 5/1967 | Kramer | 464/25 |
| 3,903,972 | 9/1975 | Bouyoucos et al. | 173/208 |
| 4,533,337 | 8/1985 | Schoeps . | |
| 4,683,961 | 8/1987 | Schoeps | 464/25 |
| 4,785,693 | 11/1988 | Minamiyama et al. | 464/25 |
| 4,789,373 | 12/1988 | Adman . | |
| 5,092,410 | 3/1992 | Wallace et al. | 464/25 |
| 5,217,079 | 6/1993 | Kettner et al. | 173/93 |
| 5,279,120 | 1/1994 | Sasaki | 173/208 |
| 5,645,130 | 7/1997 | Schoeps | 173/93 |
| 5,813,478 | 9/1998 | Kettner | 173/93 |

FOREIGN PATENT DOCUMENTS

| | | |
|---|---|---|
| 0 309 625 B1 | 4/1989 | European Pat. Off. . |

*Primary Examiner*—Eileen Dunn Lillis
*Assistant Examiner*—Kenneth Thompson
*Attorney, Agent, or Firm*—Frishauf, Holtz, Goodman, Langer & Chick, P.C.

[57] ABSTRACT

A hydraulic torque impulse generator (16) of the kind having a motor rotated drive member (18;50) formed with a fluid chamber (19;53), an impulse receiving output member (20;51) coaxial with the drive member (18;50) and extending into the fluid chamber (19;53), a hydraulic peak generating mechanism (24–27;54–59) in the fluid chamber (19;53) for producing torque impulses at relative rotation between the drive member (18;50) and the output member (20;51), and a variable volume accumulator chamber (32;64) located in the drive member (18;50) and connected to the fluid chamber (19;53) for compensating for occurring volume changes in the hydraulic fluid, wherein the accumulator chamber (32:64) is divided into a first compartment (40;71) and a second compartment (42;72) by an elastically deflectable membrane (39;73), a passage (43;65) connects the first compartment (40;71) to the fluid chamber (19;53), and the second compartment (42;72) comprises at least partly a yeildable means for biassing the membrane (39;73) toward the first compartment (40;71), and a closure unit (36;66,68) is arranged to form a clamping means for retaining the membrane (39;73) and for forming partly the accumulator chamber (32;64).

9 Claims, 2 Drawing Sheets

HYDRAULIC TORQUE IMPULSE GENERATOR

BACKGROUND OF THE INVENTION

This invention relates to a hydraulic torque impulse generator of the kind having a motor rotated drive member formed with a fluid chamber, an impulse receiving output member coaxial with the drive member and extending into the fluid chamber, a hydraulic pressure peak generating means in the fluid chamber for producing torque impulses at relative rotation between the drive member and the output member, and a variable volume fluid accumulator chamber located in the drive member and connected to the fluid chamber for compensating for occurring volume changes in the hydraulic fluid.

An impulse generator of this type is previously described in U.S. Pat. No. 4,789,373. In this prior art impulse generator, an annular accumulator chamber is located in a coaxial relationship with the output shaft and communicating with the fluid chamber via the clearance seal arround the output shaft. An annular piston is reciprocable in this chamber and is provided with 0-rings to seal off the accumulator chamber, both at its outer circumference and at its coaxial bore surrounding the output shaft. This known fluid volume compensating device is rather bulky and difficult to get completely fluid tight due to the movable seals.

In EP 0 309 625, there is disclosed another impulse generator of the type stated above, wherein a volume compensating piston-cylinder device is provided laterally but in parallel with the rotation axis of the output shaft. Also in this impulse generator, the compensation piston is fitted with 0-ring seals which are difficult to get completely fluid tight. This means that after some period of operation, hydraulic fluid has leaked past the piston seals and filled up the spaces on both sides of the piston with fluid, thereby making the volume compensating device inoperable.

Still another impulse generator of this type is described in U.S. Pat. No. 4,533,337. The volume compensating device of this impulse generator comprises an annular expansion chamber which is located in the rear end wall of the drive member and which is filled with a foamed plastic material. At expansion of the hydraulic fluid, the excessive fluid enters the expansion chamber and compresses the elastic material. The elasticity of this material is based on the fact that foamed material comprises a great number of gas filled closed cells or bubbles. A serious problem inherent in this device is the poor resistance of foamed plastic material against destructive influence of hydraulic fluid. The service life of this type of volume compensating devices is rather short, since the very thin walls of the closed cells do not withstand for very long the aggressive environment formed by the hydraulic fluid. After collapse of the closed cells the foamed material will just get soaked by the hydraulic fluid and will not provide any elasticity.

OBJECT OF THE INVENTION

It is the primary object of the invention to provide a hydraulic torque impulse generator having a compensating device for occurring fluid volume changes that is completely fluid tight, structurally simple and compact and having a long and safe service life.

Further objects and advantages of the invention will appear from the following specification and claims.

BRIEF DESCRIPTION OF THE DRAWINGS

Preferred embodiments of the invention are below described in detail with reference to the accompanying drawings.

In the drawings.

DETAILED DESCRITION

Figure 1:
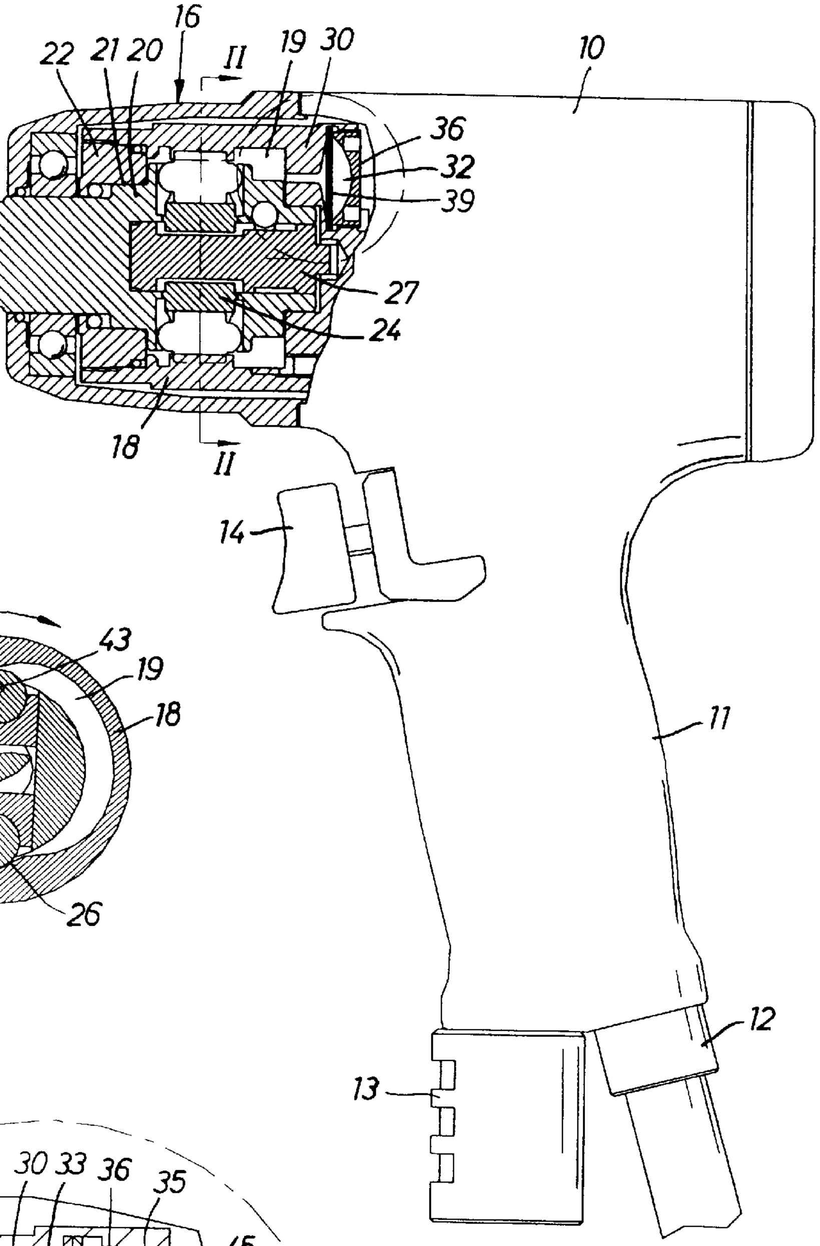
FIG. 1 shows, partly in section, a pneumatic power wrench provided with a hydraulic torque impulse generator according to the invention.
Figure 2:
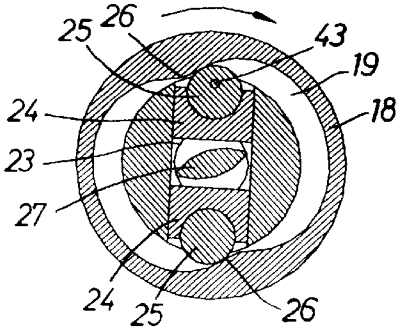
FIG. 2 shows a cross section along line II—II in FIG. 1.
Figure 3:
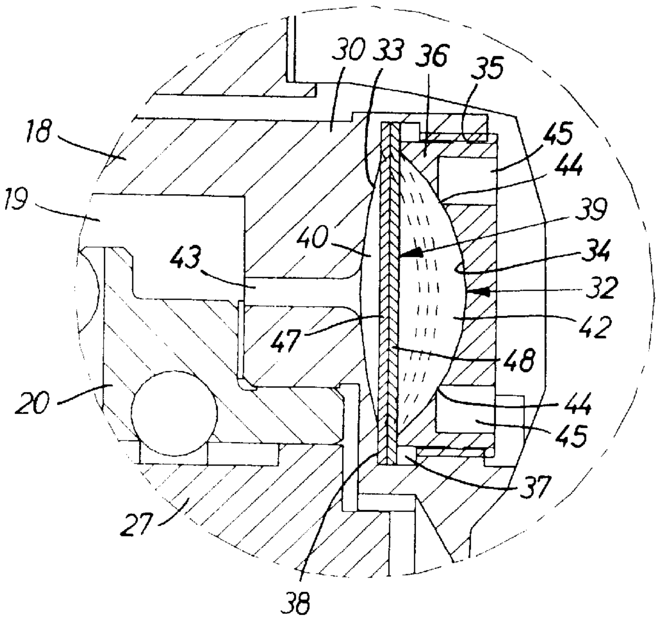
FIG. 3 shows, on a larger scale, a fractional view of the impulse generator in FIG. 1.

In FIGS. 1, 2 and 3 there is shown a pneumatic power wrench comprising a housing 10 formed with a handle 11, a pressure air supply connection 12 and an exhaust deflector 13 located on the lower extreme end of the handle 11, and a throttle valve 14 for controlling the motive air supply to the wrench.

The power wrench further comprises a pneumatic rotation motor (not shown) connected to the air supply connection 12 as well as to the exhaust deflector 13. The latter communicates with the motor via the inside area of the housing 10 which forms a part of the exhaust passage through the housing 10. The power wrench also comprises a hydraulic torque impulse generator 16 driven by the motor, and an output shaft 17 for delivering torque impulses to a screw joint to be tightened. For that purpose, the output shaft 17 is formed with a square end for carrying a standard type nut socket.

The hydraulic impulse generator 16 comprises a drive member 18 which is connected to the motor and comprises a cylindrical fluid chamber 19. The impulse generator 16 further includes an output member 20 which is formed in one piece with the output shaft 17 and extends into the fluid chamber 19 via a central opening 21 in the front end wall 22 of the drive member 18.

As clearly illustrated in FIG. 2, the output member 20 has a transverse cylinder bore 23 in which are movably guided two pistons 24. The latter are reciprocated in the cylinder bore 23 by a cam comprising two cam lobes 26 formed on the inner wall of the fluid chamber 19 and a central cam spindle 27. The cam lobes 26 act on the pistons 24 via two rollers 25. The central cam spindle 27 is rotatively journalled in the output member 20 but rotatively locked relative to the drive member 18.

At relative rotation between the drive member 18 and the output member 20, the cam lobes 26 drive simultaneously the two pistons 24 inwardly to, thereby, generate high pressure peaks in the cylinder bore 23 between the pistons 24. The torque resistance on the drive member 18 generated by the pistons 24 and rollers 25 in their engagement with the cam lobes 26 results in a momentary transfer of kinetic energy from the drive member 18 to the output member 20, thereby generating a torque impulse in the output member 20.

Upon further relative rotation between the drive member 18 and the output member 20, the cam spindle 27 acts to return the pistons 24 and rollers 25 to their outer positions before the next coming impulse stroke. This impulse generating mechanism is described in further detail in U.S. Pat. No. 5,092,410.

The drive member 18 also comprises a rear end wall 30 which is formed with a coupling (not shown) for connection to the motor. The rear end wall 30 is provided with a hydraulic fluid accumulator for receiving and returning, alternatively, hydraulic fluid as the volume of the latter changes due to, for instance temperature changes. At increasing temperature, the volume of the hydraulic fluid increases, and the additional fluid volume is absorbed by the accumulator chamber 32. When, on the other hand, the temperature of the fluid decreases, the accumulator chamber returns fluid to the fluid chamber 19 to compensate for the decreased fluid volume.

The accumulator chamber 32 is formed by a depression 33 in the end wall 30 and a concentric recess 34 in a plug shaped closure 36. A thread connection 35 is provided to mount the latter in a cylindrical bore 37 in the end wall 30. Between a shoulder 38 in the bore 37 and the inner end of the closure 36, there is clamped an elastically deflectable membrane 39 by which the accumulator chamber 32 is divided into a first compartment 40 and a second compartment 42. The first compartment 40 is defined by the depression 33 and the membrane 39, whereas the second compartment 42 is formed by the membrane 39 and the recess 34 in the closure 36. See FIG. 3.

The first compartment 40 communicates with the fluid chamber 19 via a passage 43, whereas the second compartment 42 communicates with the area outside the impulse generator 16 via openings 44 located in the bottom corners of two blind bores 45 in the closure 36. These blind bores 45 are intended also to form a grip for a closure tightening tool. However, the openings 44 have the essential purpose to communicate the air pressure from inside the power wrench housing 10 to the second accumulator chamber compartment 42, thereby obtaining a resilient bias force on the membrane 39 in the direction of the first compartment 40. The air pressure existing in the power wrench housing 10 is the outlet pressure from the air motor.

In FIG. 3, the membrane 39 is shown as consisting of two thin layers, namely one layer 47 of a material having a high resistance to hydraulic fluid and a second layer 48 having favourable properties for obtaining an elastically deflectable membrane. Accordingly, the main purpose of the first membrane layer 47 is to protect the other layer 48 from being destructed by the chemically aggressive hydraulic fluid, thereby ensuring a long and safe service life of the membrane 39.

During operation of the power wrench, repeated torque impulses are generated and delivered via the output shaft 17. This results in an increased temperature and a correspondingly increased volume in the hydraulic fluid. As a result of this increase in volume, surplus fluid escapes through the passage 43 and enters the first compartment 40 of the accumulator chamber 32. This in turn results in a deflection of the membrane 39 against the biassing action of the air pressure in the second compartment 42. The membrane 39 is deflected in the way illustrated by the dash lines in FIG. 3.

Since the impulse producing high pressure peaks are generated by the pistons 24 inside the high pressure cylinder bore 23, the fluid chamber 19 remains at a substantially constant low pressure. This means that the accumulator chamber 32 and the membrane 39 are not exposed to any high pressure peaks, which even through a very much restricted communication passage would have had a deteriorating effect on the membrane and the operation of the accumulator device.

When the power wrench is no longer in operation and the temperature of the hydraulic fluid decreases, the surplus fluid previously escaped into the accumulator chamber 32 now returns to the fluid chamber 19 via the passage 43 and by influence of the biassing force of the pressure air in the second compartment 42.

Figure 4:
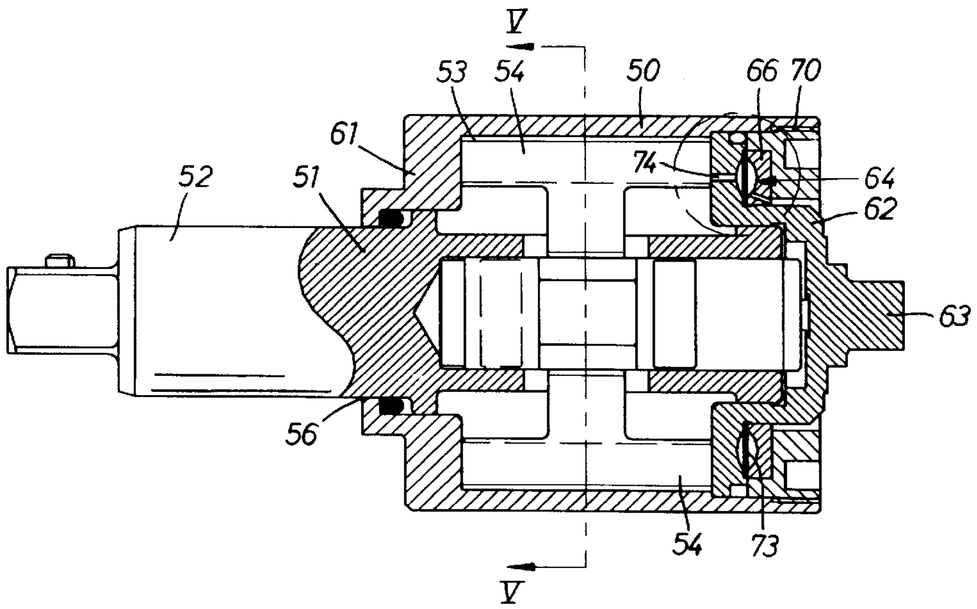
FIG. 4 shows, partly in section, a side view of an impulse generator according to an alternative embodiment of the invention.
Figure 5:
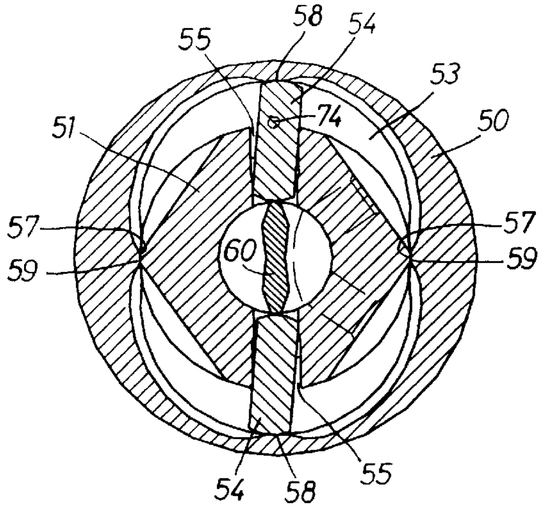
FIG. 5 shows a cross section along line V—V in FIG. 4.
Figure 6:
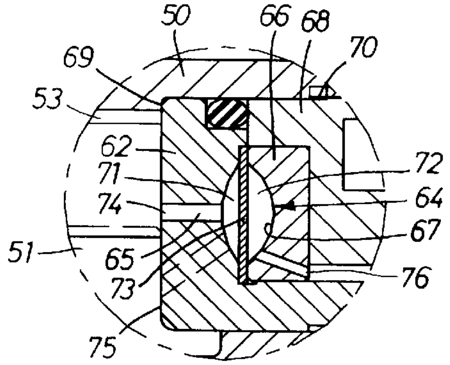
FIG. 6 shows, on a larger scale, a fraction of the impulse generator in FIG. 4.

The impulse generator shown in FIGS. 4, 5 and 6 is basically of a well known type comprising a cylindrical drive member 50 intended to be connected to a rotation motor and an output member 51 coaxial with the drive member 50 and formed integral with an output shaft 52. The drive member 50 includes a cylindrical fluid chamber 53 in which is received the rear end of the output member 51. For pressure peak generation, there are provided two radially movable vanes 54 supported in slots 55 in the output member 51. The output member 51 is also formed with longitudinally extending imovable seal ribs 57. The vanes 54 and the seal ribs 57 are intended to cooperate with seal lands 58 and 59, respectively, on the inner wall of the fluid chamber 53 to produce repeated high pressure peaks in the fluid chamber 53.

A central cam spindle 60 is rotatively journalled in the output member 51 but rotatively locked relative to the drive member 50. The cam spindle 60 is arranged to move the vanes outwardly before each impulse to be generated so as to ensure that the vanes 54 get into their sealing contacts with the seal lands 58.

The drive member 50 further comprises a front end wall 61 with a central opening 56 for penetration of the output member 51, and a rear end wall 62 which is provided with a stub axle 63 for connection to a rotation motor. The rear end wall 62 is also formed with an annular accumulator chamber 64 which is connected to the fluid chamber 53 via a passage 65. The accumulator chamber 64 is defined by an annular closure unit comprising a ring element 66 with an annular recess 67 and a retainer ring 68 mounted in the rear end of the drive member 50 by means of a thread connection 70. So, when mounted on the drive member 50, the retainer ring 68 presses via the thread connection 70 the ring element 66 towards the end wall 61. It also clamps the end wall 61 against a shoulder 69 in the drive member 50 so as to firmly fix the end wall 62 relative to the drive member 50.

The accumulator chamber 64 is divided into a first annular compartment 71 and a second annular compartment 72 by an annular membrane 73. The first compartment 71 is connected to the fluid chamber 53 via the passage 65 which has an opening 74 communicating with the fluid chamber 53 via a clearance seal for protection of the accumulator chamber 50 and the membrane 73 against high pressure peaks. As illustrated in FIG. 5, the opening 74 is located so as to be covered by the end surface of a vane 54 as a high pressure peak is generated in the fluid chamber 53.

In FIG. 6, there is illustrated in dash lines an alternative location of the opening 74, namely in between the end wall 61 and a shoulder 75 on the output member 51. By this arrangement, there is ensured that high pressure peaks are unable to reach the opening 74 and the accumulator chamber 64.

As in the firstly described embodiment, the second compartment 71 of the accumulator chamber 64 is provided with a passage 76 for connection to the area outside the drive member 50 where the outlet pressure of the motor prevails. This means that the biassing force on the membrane 73 is accomplished by pressure air.

The embodiments of the invention are not limited to the above described examples but may be freely varied within the scope of the claims. For instance, the biassing force on the membrane, circular or annular, may very well be accomplished by another resilient means.

In embodiments of the invention where an electric motor is used, there will be no increased air pressure in the surrounding housng to be used as a membrane biassing means. As an alternative membrane biassing means the second accumulator compartment may be completely closed such that the air volume therein will act as a spring means and act with an elastic bias force on the membrane. Another alternative bias means for the membrane could be a foamed plastic or rubber material cushion inserted in the second accumulator compartment.

What is claimed is:

1. A hydraulic torque impulse generator for a power wrench having a rotation motor, said hydraulic torque impulse generator comprising:

a drive member adapted to be connected to the rotation motor, said drive member having a hydraulic fluid chamber with two opposite end walls;

an impulse receiving output member extending coaxially into said hydraulic fluid chamber, said impulse receiving output member being coupled to said drive member via a hydraulic pressure pulse generating device dividing said hydraulic fluid chamber into at least one low pressure section and at least one high pressure section; and a variable volume accumulator chamber connected to said hydraulic fluid chamber via a communication passage, said variable volume accumulator chamber including a yieldable member;

wherein:

i) said accumulator chamber is formed partly by a depression in one of said opposite end walls of said drive member and partly by a closure rigidly secured to said end wall, ii) a bore extends from outside said end wall (30), said bore being adapted to receive at least partly said closure, iii) said depression is formed at a bottom of said bore, and an annular shoulder is formed around said depression, iv) said yieldable member comprises an elastically deflectable membrane which is secured by clamping between said closure and said annular shoulder, and v) said communication passage is arranged to connect said accumulator chamber to said at least one low pressure section so as to prevent pressure impulses repeatedly generated in said at least one high pressure section from reaching said accumulator chamber.

2. The impulse generator according to claim 1, wherein said elastically deflectable membrane is biassed toward said fluid chamber by pressure air supplied through at least one passage in said closure.

3. The impulse generator according to claim 2, wherein said closure is secured to said bore via a threaded connection.

4. The impulse generator according to claim 1, wherein said closure comprises an at least partly spherical recess forming a support for said elastically deflectable membrane as said elastically deformable membrane is fully deflected at a maximum hydraulic fluid volume.

5. The impulse generator according to claim 2, wherein said closure comprises an at least partly spherical recess forming a support for said elastically deflectable membrane as said elastically deformable membrane is fully deflected at a maximum hydraulic fluid volume.

6. The impulse generator according to claim 3, wherein said closure comprises an at least partly spherical recess forming a support for said elastically deflectable membrane as said elastically deformable membrane is fully deflected at a maximum hydraulic fluid volume.

7. The impulse generator according to claim 4, wherein said at least one high pressure section is formed by a high pressure cylinder transversely provided in said output member, and two piston elements are reciprocally activated in an opposite action by a cam mechanism for accomplishing torque impulse producing pressure peaks in said high pressure cylinder.

8. The impulse generator according to claim 5, wherein said at least one high pressure section is formed by a high pressure cylinder transversely provided in said output member, and two piston elements are reciprocally activated in an opposite action by a cam mechanism for accomplishing torque impulse producing pressure peaks in said high pressure cylinder.

9. The impulse generator according to claim 6, wherein said at least one high pressure section is formed by a high pressure cylinder transversely provided in said output member, and two piston elements are reciprocally activated in an opposite action by a cam mechanism for accomplishing torque impulse producing pressure peaks in said high pressure cylinder.

* * * * *

UNITED STATES PATENT AND TRADEMARK OFFICE
CERTIFICATE OF CORRECTION

PATENT NO. : 6,110,045
DATED : August 29, 2000
INVENTOR(S) : Knut Christian Schoeps It is certified that error appears in the above-identified patent and that said Letters Patent is hereby corrected as shown below:

Title page,

Item [73] Assignee, change "Tokyo, Japan" to -- Nacka, Sweden --,

Insert -- Item [30] Foreign Application Priority Data
Jun. 9, 1997 [SE] Sweden ...........9702190-1 --.

Signed and Sealed this

Second Day of October, 2001

*Attest:*

*Nicholas P. Godici*

NICHOLAS P. GODICI

*Attesting Officer* *Acting Director of the United States Patent and Trademark Office*